United States Patent Office 3,511,889
Patented May 12, 1970

3,511,889
METHOD OF PURIFYING NAPHTHALENE
Nikolai Nikolaevich Vorozhtsov, Akademicheskaya ul. 30, Valentin Afanasievich Koptjug, Morskoi prospekt, 42, kv. 19, Albert Georgievich Khmelnitsky, Zhemchuzhnaya ul. 2, kv. 16, and Alexei Petrovich Krysin, Zhemchuzhnaya ul. 26, kv. 20, all of Novosibirsk, U.S.S.R.
No Drawing. Filed Oct. 10, 1967, Ser. No. 674,133
Int. Cl. C07c 7/12, 15/24
U.S. Cl. 260—674                              4 Claims

ABSTRACT OF THE DISCLOSURE

A method of purifying naphthalene comprising passing vapors of technical naphthalene over an alumino-silicate catalyst in a flow of air or an inert gas at temperatures ranging from 300° to 450° C. and subsequently distilling the catalysate thus obtained. The process can be also accomplished on catalyst surfaces having partial deposits of carbonaceous matter.

---

This invention relates to methods of purifying naphthalene.

A known method of purifying naphthalene comprises passing naphthalene vapors in an air flow over an oxidation catalyst, e.g. iron oxides at a temperature of about 350 to 500° C. (cf. British Pat. No. 692,098).

Another known method of purifying naphthalene consists in passing naphthalene vapors in a flow of nitrogen at a temperature of about 450 to 600° C. over a hydrogenation catalyst e.g. an oxide of a metal in the left-hand column of Group VI of the Periodic Table (cf. U.S. Pat. No. 2,916,533).

The drawback of these methods is that they employ uncommon catalysts.

A disadvantage of the first-mentioned method is that it provides the possibility of removing from the naphthalene only oxidizable impurities, whereas the naphthalene may contain other impurities affecting its properties which do not oxidize under said conditions.

In addition, the amount of air employed in the process of purifying the naphthalene must be theoretically calculated taking into account the amount of oxidizable impurities in the naphthalene, which calculations are laborious.

Another disadvantage of the first-mentioned method is that the regeneration of the spent catalyst is an extremely complicated process since the carbonaceous material deposited thereon must be burned off. This is carried out at a temperature exceeding the temperature of the naphthalene purification process proper, and involves high air consumption.

A disadvantage of the second method is that it employs expensive catalysts.

Another disadvantage is the high temperature under which the process is carried out.

An additional disadvantage is the fact that the catalyst is regenerated by means of hydrogen, which complicates the process due to hydrogen explosiveness.

It is an object of the present invention to provide a method of purifying naphthalene which premits the use of low-cost, standard, commercial catalysts.

It is another object of the present invention to provide a method of purifying naphthalene which permits of removing all organic impurities from naphthalene.

A still further object of the present invention is to avoid laborious calculations of the amount of air necessary for carrying out the process.

It is also an object of the present invention to simplify the catalyst regeneration by lowering the temperature of regeneration, to reduce the consumption of air and to obviate the use of hydrogen in the process.

According to the present invention, these and other objects are accomplished by a process wherein an aluminosilicate catalyst is employed and said process is carried out at a temperature of about 300 to 450° C.

The purification of naphthalene is carried out in an air flow, in which the air-to-melted naphthalene volume ratio is 40–250:1.

The process may also be carried out in a flow of nitrogen, in which the nitrogen-to-melted naphthalene volume ratio is 40–250:1.

The air (or nitrogen)-to-naphthalene volume ratio is selected depending upon the amount of impurities contained in the naphthalene and the requirements to be met by the purified naphthalene.

During the process of purification of naphthalene in the air flow, the feed of the naphthalene vapors is terminated at regular intervals and the air supply reduced by 3 to 6 times whenever necessary to regenerate the catalyst.

The method is carried out in the following way.

The naphthalene to be purified is melted and fed into a vaporizer with the aid of a metering device; the air or nitrogen being simultaneously fed to said vaporizer in the amount corresponding to the air (nitrogen)-to-naphthalene volume ratio of 40–250:1. The vapor-gas mixture is next passed at a temperature of 300 to 450° C. through a layer of a standard aluminosilicate catalyst, e.g. a cracking catalyst. The throughput rate is 0.2 to 2.1 volumes of liquid naphthalene per volume of catalyst per hour.

During the purification process, when employing air, the impurities are subjected to a dehydrogenation condensation resulting in the formation of high-molecular compounds, part of which are deposited on the catalyst in the form of carbonaceous material and the rest being removed together with the catalysate. A negligible amount of the naphthalene proper is subject to said conversion as well.

The process of removing impurities when employing nitrogen a a containing gas is of a reductive nature. The bulk of the impurities, the sulfur-containing compounds in particular (e.g. thionaphthene), is reduced, and the sulfur in the form of $H_2S$ is removed with exhaust gases. In this case, as in the case above, high-molecular compounds are formed, part of which are deposited on the catalyst and the other part being removed with the exhaust catalysate.

All organic impurities (oxidizable and nonoxidizable) contained in the naphthalene can be removed by alternating the two methods.

The catalysate yield amounts to 96.5% on the basis of the charged naphthalene.

To remove the carbonaceous material deposited on the aluminosilicate catalyst during the purification process which reduces the catalyst activity, said catalyst may be regenerated by a conventional method which comprises terminating the naphthalene feed, elevating the temperature 550 to 600° C. and feeding a large amount of air (450 to 500 volumes of air (N.T.P.) per volume of the catalyst per hour). Also, if the naphthalene is being purified with air, the catalyst recovery may be effected by terminating the feed of the naphthalene at regular intervals and by reducing the air delivery by 3 to 6 times up to 40 volumes per volume of the catalyst.

During regeneration of the catalyst, the residual content of carbonaceous material is partially reduced up to 4 to 12% of the total weight of the catalyst and the carbonaceous material.

The duration of the purification and regeneration cycles, as well as the amount of the residual content of carbonaceous material on the catalyst, depend upon the desired quality of the catalysate.

The catalysate vapors obtained by purification are condensed and subjected to simple or fractional distillation to remove the high-molecular compounds formed during the purification process from the naphthalene.

The distillation results in purified naphthalene, which is the final commercial product.

The present purification method makes it possible to obtain naphthalene of a high degree of purity having a crystallizing point of up to 80.0° C. and suitable for use as a raw material for processes of organic synthesis.

For a better understanding of the present invention, the following examples are given by way of illustration.

EXAMPLE 1

In a quartz-glass tube are loaded synthetic aluminosilicate cracking catalyst in the shape of balls and a layer of broken quartz glass forming a vaporization zone for melted naphthalene. The melted hot pressed naphthalene having a crystallizing point of 79.0° C. is fed into said tube at a temperature of the catalyst ranging from about 420 to 450° C., the feed rate being 0.8 liter per liter of catalyst per hour. Concurrently with the naphthalene, air in the amount of 250 liters (N.T.P.) per liter of liquid naphthalene is fed into said tube. The process under said conditions is carried out for 50 min., the yield of the catalysate being 93% on the basis of the charged naphthalene. Then, the naphthalene feed is terminated and, with heating conditions unchanged, the air delivery is reduced by 6 times by diminishing the air feed rate to 40 liters (N.T.P.) per liter of the catalyst per hour. Under these conditions, the process is carried out for an hour. In this case, a partial removal of carbonaceous material from the catalyst surface takes place, the residual content of the carbonaceous material being 4.5% of the total weight of the catalyst and the carbonaceous material. From here on the cycles of naphthalene purification and catalyst regeneration alternate.

Under the above conditions, the process of naphthalene purification and catalyst recovery features no noticeable reduction in catalyst activity after processing 40 kg. of naphthalene per liter of catalyst.

The catalysate obtained after several cycles of the purification of naphthalene is subjected to simple distillation. In this case, a purified naphthalene with a crystallizing point of 79.8 to 79.9° C. is obtained.

EXAMPLE 2

In a tube made of refractory glass are charged a pelleted, synthetic, aluminosilicate cracking catalyst and a layer of broken quartz glass forming a vaporization zone for melted naphthalene. At a catalyst temperature of 300° C., melted hot pressed naphthalene having a crystallizing point of 78.7° C. is fed into said tube at a rate of 0.2 liter per liter of the catalyst. Fed into the tube concurrently with melted naphthalene is nitrogen in the amount of 250 liters (N.T.P.) per liter of liquid naphthalene.

The catalysate yield amounts to 95% on the basis of the weight of the charged naphthalene.

The simple distillation of the catalysate results in a purified naphthalene having a crystallizing point of 79.7° C.

The reactivation of the catalyst is carried out by a conventional method.

The cycles of naphthalene purification and catalyst recovery alternate.

Though the present invention has been described in accordance with a preferred embodiment thereof, various changes and modifications may be made in carrying out the invention without departing from the spirit and scope thereof as will be understood by those skilled in the art.

These changes and modifications are to be considered as falling within the spirit and scope of the invention as defined in the appended claims.

We claim:

1. A method of purifying naphthalene, comprising passing naphthalene vapors over an aluminosilicate catalyst at a temperature of about 300 to 450° C.

2. A method according to claim 1, wherein the naphthalene vapors are passed over the catalyst in an air flow in which the air-to-liquid naphthalene volume ratio is 40–250:1.

3. A method according to claim 1, wherein the naphthalene vapors are passed over the catalyst in a flow of nitrogen in which the nitrogen-to-liquid naphthalene volume ratio is 40–250:1.

4. A method according to claim 2, wherein during the purification process the feed of naphthalene vapors is terminated at regular intervals and the delivery of air is reduced by 3 to 6 times to regenerate the catalyst.

References Cited

UNITED STATES PATENTS

| | | | |
|---|---|---|---|
| 2,134,824 | 11/1938 | Hiatt | 208—245 |
| 2,640,010 | 5/1953 | Hoover | 208—245 |

FOREIGN PATENTS 465,969  6/1950  Canada.

DELBERT E. GANTZ, Primary Examiner

C. R. DAVIS, Assistant Examiner